US008950773B2

(12) United States Patent
Wright

(10) Patent No.: US 8,950,773 B2

(45) Date of Patent: Feb. 10, 2015

(54) EXTENDABLE WHEELCHAIR DEVICE FOR SUPPORTING THE FEET OF THE USER

(71) Applicant: Sharon S Wright, Anderson, IN (US)

(72) Inventor: Sharon S Wright, Anderson, IN (US)

( * ) Notice: Subject to any disclaimer, the term of this patent is extended or adjusted under 35 U.S.C. 154(b) by 0 days.

(21) Appl. No.: 14/143,055

(22) Filed: Dec. 30, 2013

(65) Prior Publication Data

US 2014/0110917 A1 Apr. 24, 2014

Related U.S. Application Data

(63) Continuation-in-part of application No. 13/304,972, filed on Nov. 28, 2011, now Pat. No. 8,651,506.

(51) Int. Cl.

| | |
|---|---|
| ***A61G 5/10*** | (2006.01) |
| ***B62J 25/00*** | (2006.01) |
| ***A61G 5/12*** | (2006.01) |

(52) U.S. Cl.

CPC ............ *A61G 5/12* (2013.01); *A61G 2005/128* (2013.01)

USPC ........................................ 280/291; 280/304.1

(58) Field of Classification Search

CPC ....... A61G 5/10; A61G 5/12; A61G 2005/12; A61G 2005/128; B62J 25/00

USPC .............. 280/250.1, 288.1, 288.4, 291, 304.1

See application file for complete search history.

(56) References Cited

U.S. PATENT DOCUMENTS

| | | | | |
|---|---|---|---|---|
| 3,367,327 | A | 2/1968 | Rybcznki | |
| 3,848,922 | A * | 11/1974 | Blanford | 297/219.1 |
| 3,860,285 | A | 1/1975 | Hartman | |
| 3,863,984 | A | 2/1975 | Sickels | |
| 4,227,742 | A | 10/1980 | Thomas | |
| 4,243,265 | A | 1/1981 | Hanik | |
| 4,486,048 | A | 12/1984 | Meyer | |
| 4,564,238 | A | 1/1986 | Wolpert et al. | |
| D305,521 | S | 1/1990 | Wiatrak et al. | |
| D315,539 | S | 3/1991 | Okamoto | |
| D340,594 | S | 10/1993 | Lambert | |
| 5,833,318 | A | 11/1998 | Knight | |
| 6,089,658 | A | 7/2000 | Law | |
| 6,773,073 | B1 | 8/2004 | Escobedo | |
| 7,121,572 | B1 * | 10/2006 | Jaffe et al. | 280/304.1 |
| 8,651,506 | B2 * | 2/2014 | Wright | 280/291 |
| 2003/0146597 | A1 * | 8/2003 | Donnelly | 280/291 |

* cited by examiner

*Primary Examiner* — Joseph Rocca

*Assistant Examiner* — Marc A Scharich

(74) *Attorney, Agent, or Firm* — John D Ritchison; Ritchison Law Offices, PC

(57) ABSTRACT

A wheelchair device made for fully supporting the feet of the user. It spans the space between the left and right foot rest pedals. It is comprised of a length of a sleeve made of a durable material and configured with at least one open end; an elongated cross-section; a top surface tread; an essentially smooth bottom surface featuring a shelf; and an internal aperture wherein one of the end with an internal aperture of the device may slide over and essentially encase either of the foot plates of the wheelchair and wherein the opposite end with the recess may rest on the other un-encased foot plate which results in a bridge of the space between the two pedals. An alternative embodiment features an extension tube for various widths of wheelchairs.

15 Claims, 11 Drawing Sheets

Section B - B 39
39
35
39
38
31A

Open end 32
31A 35A
35A
31A
38
35
31A

Section D - D

Section E - E

FootBridge
40A
42
43
44
45
46
47
48
36A
R1
R2
T3
W1OD
W1ID
W2OD
W2ID
H1OD
H1ID
H2OD
H2ID
L1
L1A Variation of 11 D Repeated

H2OD
H2ID
43
W2OD
W2ID

Repeated
T2

43
40B
H3OD

T3

W3OD
49
49
43

49
L2

43

43
L3

49

49

49
49

49
43
40B 43
43
40B

EXTENDABLE WHEELCHAIR DEVICE FOR SUPPORTING THE FEET OF THE USER

CROSS-REFERENCE TO RELATED APPLICATIONS

This application is a Continuation-in-Part [CIP] filed under 37 CFR 1.53(b) and claims the benefit of the original, non-provisional (Regular Utility) U.S. patent application Ser. No. 13/304,972 submitted Nov. 28, 2011 and Published May 31, 2012 as US 2012/0133109 A1. The original application was active on the date of the submission of this CIP. The original application and publication are both entitled a "SPECIAL WHEELCHAIR DEVICE FOR FULLY SUPPORTING THE FEET OF THE USER" and were submitted by Sharon S. Wright. The original application is incorporated fully by reference as if it were reproduced here, verbatim. This application also claims the benefit of Provisional Patent Application Ser. No. 61/417,447 filed Nov. 28, 2010 by Sharon S. Wright and entitled "Special wheelchair device for fully supporting the feet of the user".

FIELD OF INVENTION

This invention is a special wheelchair device for fully supporting the feet of the user. The present device relates to wheelchair foot rest or supports and more particularly pertains to a new wheelchair support accessory for providing added comfort to a person confined to a wheelchair. The device includes the original one piece support option and the continuation with an extendable tube for the wheelchair device for supporting a pair of feet of the user.

FEDERALLY SPONSORED RESEARCH

None.

SEQUENCE LISTING OR PROGRAM

None.

BACKGROUND-FIELD OF INVENTION AND PRIOR ART

A. Introduction to Problem Addressed

The use of both wheelchair feet and wheelchair leg supports is known in the prior art. Wheelchair leg supports heretofore devised and utilized are known to consist basically of familiar, expected and obvious structural configurations, notwithstanding the myriad of designs encompassed by the crowded prior art which have been developed for the fulfillment of countless other objectives and requirements. Millions of wheel chairs, new and old, have simple foot rests (foot plates or pedals) that are attached so that the tubes of the chair can be removed. They are all inherently designed so that the tubes connected to the foot rest mechanisms may be removed; so that the whole mechanism can swing away; and, so that there is left a defined space or gap between each side. However, the defined space between the left and right plates or pedals can be problematic for many if not most users who need and desire a full rest plate across the full expanse of the wheel chair plates and leave no unsupported space. The PROBLEM ADDRESSED IS the elimination of this space or gap.

B. Prior Art

It is believed that this product is unique in its design and technologies. However, in prior art, disclosures have been made for wheelchair supports with many of the disclosures including complex devices. Prior art begins with U.S. Pat. No. 3,367,327 issued in 1968 to Rybcznski for a foot restraining means. What is shown is an attachable device that is connected to footplates/foot pedals with tools and then restrains the feet. Movement is restricted unlike the new Wright device and the restrain requires tools to put into place and attach to the wheelchair. Another U.S. Pat. No. 3,860,285 issued in 1975 to Hartman for a combined wheelchair tray and footrest. The combination device teaches a combined wheelchair, tray and foot rest assembly having a mechanism for permitting the tray and footrest to be moved horizontally and preventing the accidental removal from the wheelchair. Further, the mechanism permits the tray to be swung from a position of use to a stored position adjacent the side of the wheelchair. The device must be assembled with the wheelchair with tools, creates pinch points and needlessly replaces the already provided footplates. This is more costly and less safe than the Wright device shown here.

A further prior art is shown in U.S. Pat. No. 3,863,984 issued in 1975 to Sickels was for a leg-supporting-and-retaining device attachable to an elevatable legrest of a wheelchair. Taught here is a device that attaches to an elevatable legrest of a wheel chair for supporting and retaining the leg of an individual sitting in the wheel chair upon the legrest. The device is composed of a single sheet of resilient material configured at one end into a clamp for detachably clamping the device to the elevatable legrest and configured at the other end into a support for releasably supporting and retaining the leg upon the legrest when the legrest is at any desired elevation. The device restrains the leg to prevent movement. Wright permits full movement of legs and feet and supports the bottom of the feet for the comfort of the patient/user. Next, in U.S. Pat. No. 4,227,742 issued in 1980 to Thomas was for a multi-position, retractable legrest as part of a wheelchair. Another leg device shown here demonstrates a full wheelchair which includes an improved, retractable multi-position leg rest apparatus. The leg rest is attached to the frame of the footrest of the wheelchair in a conventional manner. The leg rest cushion is carried on a frame which slidably engages the footrest frame. A rotatable U-shaped transverse member comprises part of the leg rest frame and is adapted to selectively engage a hook on the underside of the leg rest cushion to lock the rear end of the cushion in an elevated position. The rear of the leg rest cushion can be lowered by disengaging the tubular member from the hook. The device is more complex and costly than the simple Wright device.

In U.S. Pat. No. 4,243,265 was issued in Hanik to 1981 for a patient chair slipper. Demonstrated here is an open-ended slipper suitable for attachment to the footplate of a patient chair, comprising a generally rectangular base strip adapted for placement upon a footplate and straps means for creating openings for receiving a user's foot. Other means shown are for attaching the device from its lower surface to the footplate. The device merely restrains foot movement and does not fill the gap between the footplates/foot pedals like that of the Wright invention. In still another U.S. Pat. No. 4,486,048 issued in 1984 to Meyer was for a leg support for a wheelchair. Here Meyer taught a leg support for a wheelchair, comprising a vertical supporting tube, which is detachably mountable on said wheelchair, the upper end of said supporting tube having a horizontal arm mounted thereon, which arm extends in the direction of travel and on which arm a leg support carrier, supporting a foot-plate and a calf-plate, is pivotably mounted by means of its upper end, in which the leg support carrier is formed by an external telescopic tube and an internal telescopic tube inserted into the external telescopic tube, both tubes being pivotably mounted on the arm about their own respective swivel axles. This is a complex leg support which is more expensive to attach with tools and a person of some technical skills.

Additionally, in U.S. Pat. No. 4,564,238 was issued in 1986 to Wolpert, Jr. for a leg-rests for a modified wheelchair. The Wolpert concept was an improved wheel chair foot/leg rest that discloses a device that can be retro-fitted onto existing wheel chair. A series of parallel tubes attach under the wheel chair seat, and house sliding tubes that carry a rotating foot/leg rest. This requires tools and is a bulky add to the chair. When not in use it requires some sizeable storage areas. In U.S. Pat. No. Des 305,521 was issued in 1990 to Wiatrak, et al for a wheelchair foot board. The art shown there was a single side footplate. Nothing is taught that fills the gap between the footplates. In another U.S. Pat. No. Des 315,539 issued in 1991 to Okamoto for a footplate assembly for a wheelchair. In this device is shown a strap that fits the side of a footplate. Nothing is taught that fills the gap between the footplates.

Prior art in U.S. Pat. No. Des. 340,594 that was issued in 1993 to Lambert was for a leg supports for wheelchair occupants. Here is shown a separate foot stand or rest device that is paced separate from the wheelchair with the wheelchair to ostensibly support feet. Unlike Wright it does not couple to the wheelchair and "move" when the chair is moved. It also is in a fixed configuration and is not universal to all wheelchair spacing and configurations of the footplates. In another U.S. Pat. No. 5,833,318 issued in 1998 to Knight was for a wheelchair support accessory. This showed a wheelchair support accessory for a person confined to a wheelchair which includes a support board having a generally rectangular configuration. The support board has a long top edge, a long bottom edge and short opposed side edges. The device is made of several pieces and has fitted recesses that may not be configured for universal usage. It is complex and made of more expensive materials than the Wright invention.

Recently, in U.S. Pat. No. 6,089,658 was issued in 2000 to Law for a wheelchair footplate cover and stabilizer. Shown was a cover and stabilizer made of a thin ridged material that slips over wheelchair footplates. The preferred material is metal and has several breaks and angles. The patient and staff are exposed to sharp corners when fitting the device over the footrests. The device requires expensive process tooling to the break presses or the molding equipment and tools. The Wright device has no sharp corners and may be made of various materials including recycled materials. The Wright design discloses, teaches and suggests several features not shown in the Law patent. Finally in U.S. Pat. No. 6,773,073 that was issued in 2004 to Escobedo was for an adjustable footrest. Taught here was an adjustable foot rest for being used with a wheelchair to allow the foot of the user to positioned at a comfortable angle. The adjustable foot rest includes an adjustment assembly being designed for being coupled to hanger bracket of the wheel chair. A rest member is pivotally coupled to the adjustment assembly on the wheelchair. The rest member is designed for supporting the foot of the user when the user is sitting in the wheelchair and may be positioned at any angle. The device is more complex and requires tools to attach to the wheelchair, unlike the unique Wright device that assembles without tools and simply slips onto the wheelchair footplates.

While these devices described above in many respects fulfill their respective, particular objectives and requirements, the aforementioned patents do not disclose the new Wright wheelchair foot support accessory. None of them solve the problem of the unsupported space between the foot plates. None of the prior art anticipates the Wright invention nor show configurations or concepts that would make the Wright device obvious to one of ordinary skill in the area and art of wheelchair structures. The inventive Wright device includes a support board having a generally rectangular configuration that fits over the existing foot supports. The recess of the device is configured to engage an existing leg rest frame of a wheelchair.

In many respects, the wheelchair support accessory according to the present invention substantially departs from the conventional concepts and designs of the prior art, and in so doing provides an apparatus primarily developed for the purpose of providing added comfort to a person confined to a wheelchair. At the same time, a caretaker of the user finds placement of the device easy. However, as far as is known, there is no other special wheelchair device for fully supporting the feet of the user at the present time which fully provide these improvements and functional characteristics as the present device. It is believed that this device is made with fewer parts and with improved configurations and physical features to provide more functionality when compared to other currently utilized devices or methods to provide foot supports for wheelchairs. The particular combinations of materials and features are unique and novel. As stated above, the objectives and solutions of the Wright device are not anticipated by prior art.

SUMMARY OF THE INVENTION

The device herein is a special wheelchair device for fully supporting the feet of the user. It is a simple, sleeve-like device to span the space between the two (left and right) foot rests. The special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf and recess; and configured with an internal aperture with features wherein one of the end with an internal aperture of the device may slide over and essentially encases either of the foot plates of the wheelchair and wherein the opposite un-encased end with the shelf may rest on the other of the foot plates which results in a closure of the space between the two foot plates. An alternative embodiment is a wheelchair device for fully supporting a pair of feet of a user, the device comprised of (a) an partially enclosed sleeve of a length, a height, a width and a thickness, the sleeve with two ends, made of a durable material and configured with: (i) at least one of the two ends as an open tubular end with an encasing cross-section; (ii) at least two side surfaces; (iii) a second end opposite the open tubular end, elongated and with an essentially smooth bottom surface, and forming a shelf with the sides; (iv) a top surface of the sleeve with features; and (v) a means for securing the top and bottom surfaces; and (b) a tubular enclosed sleeve of a length, a height, a width and a thickness, the tubular enclosed sleeve with two ends, made of a durable material and configured with a cross-section less in height and width to enable the tubular enclosed sleeve to telescope interiorly to the partially enclosed sleeve wherein the tubular enclosed sleeve can slide over and essentially encase one of a pair of foot plates of the wheelchair and wherein the opposite shelf end of the partially enclosed sleeve may rest on the other un-encased pair of foot plates which results in a bridging of the space between the two foot plates.

OBJECTIVES AND ADVANTAGES

There are several objectives and advantages of the special wheelchair device for fully supporting the feet of the user.

There are currently no known wheelchair accessories or support devices that are effective at providing the objectives of this invention in a simple and common sense manner.

The invention presented is a special wheelchair device for fully supporting the feet of the user. This device relates to a growing need for a better means of support for the feet of persons in wheelchairs. Particularly, this new special wheelchair device for fully supporting the feet of the user is related to devices and methods to add simplicity, safety and ease for foot support with wheelchairs. Many wheelchair devices have been developed, but are too complex to use and very difficult to install. This is particularly true for the elderly. Therefore, an easy-to-install and simple device that does not require tools is a major advantage and the main objective for this device.

The following TABLE A summarizes various advantages and objectives of the special wheelchair device for fully supporting the feet of the user. This list is exemplary and not limiting to the many advantages offered by this new device.

TABLE A

Various Benefits, Advantages and Objectives
This device:

| ITEM | BENEFIT |
|---|---|
| 1. | Increases the support for feet of the user, especially the elderly, infirm or others who are not ambulatory and who may spend long periods of time in the wheelchair. |
| 2. | Is easy to handle and install for wheelchair users and caretakers. |
| 3. | Requires no tools for installation. |
| 4. | Is simple to manufacture. |
| 5. | Has no sharp edges or pinch points. |
| 6. | May be manufactured from recycled materials. |
| 7. | Is a universal design that fits practically all designs of wheelchairs both new and used. |
| 8. | Is small and compact so that it is easy to package for sale or kept in storage |
| 9. | Expands to fit many sizes and widths of wheel chairs |
| 10. | Is easy to adjust |
| 11. | Minimizes production tools required |

Noteworthy is that other advantages and additional features of the special wheelchair device for fully supporting the feet of the user will be more apparent from the accompanying drawings and from the full description of the device. For one skilled in the art of wheel chair devices and accessories, it is readily understood that the features shown in the examples with this device are readily adapted for improvement to other types of mechanisms and devices for use with wheelchairs.

DESCRIPTION OF THE DRAWINGS

Figures

The accompanying drawings, which are incorporated in and constitute a part of this specification, illustrate preferred and alternative embodiments for the special wheelchair device for fully supporting the feet of the user. The drawings, together with the summary description given above and a detailed description given below, serve to explain the principles of the special wheelchair support device. It is understood, however, that the device is not limited to only the precise arrangements and instrumentalities shown.

FIGS. 13 A through 13 D are sketches of an alternative tube system as an extension device for the wheelchair support. wheelchair devices for supporting the feet of the user.

FIGS. 14 A through 14 E are sketches of the alternative extension shelf used interior to the tube.

DESCRIPTION OF THE DRAWINGS

Reference Numerals

Figure 2:
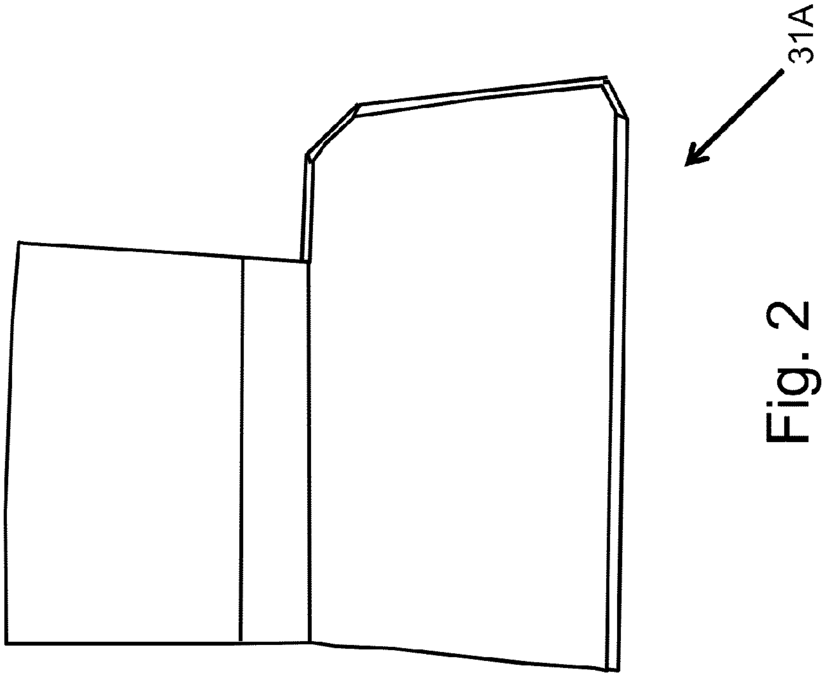
FIG. 2 shows a sketch of the prototype of the preferred embodiment of the special wheelchair device for fully supporting the feet of the user with the specific features.

The following list refers to the drawings:

TABLE B

Reference numbers.

| Ref # | Description |
|---|---|
| 31 | preferred embodiment 31 of the special wheelchair device for fully supporting the feet of the user |
| 31A | prototype device 31A |
| 31B | alternative embodiment 31B with split open end |
| 31C | alternative embodiment 31C with single end, hinged plate |
| 32 | open end 32 of device |
| 32A | aperture 32A |
| 33 | opposite 33 open or closed end of device |
| 34 | shelf configuration 34 |
| 35 | top surface 35 |
| 35A | angle, rounded or beveled or the like corners 35A - no cut configuration |
| 36 | treads, rough surface 36 or the like |
| 36A | writing or trademark 36A embossed or engraved on surface |
| 37 | closer retainer feature of vanes 37 or the like |

TABLE B-continued

Reference numbers.

Figures 8A, 8B, 8C:
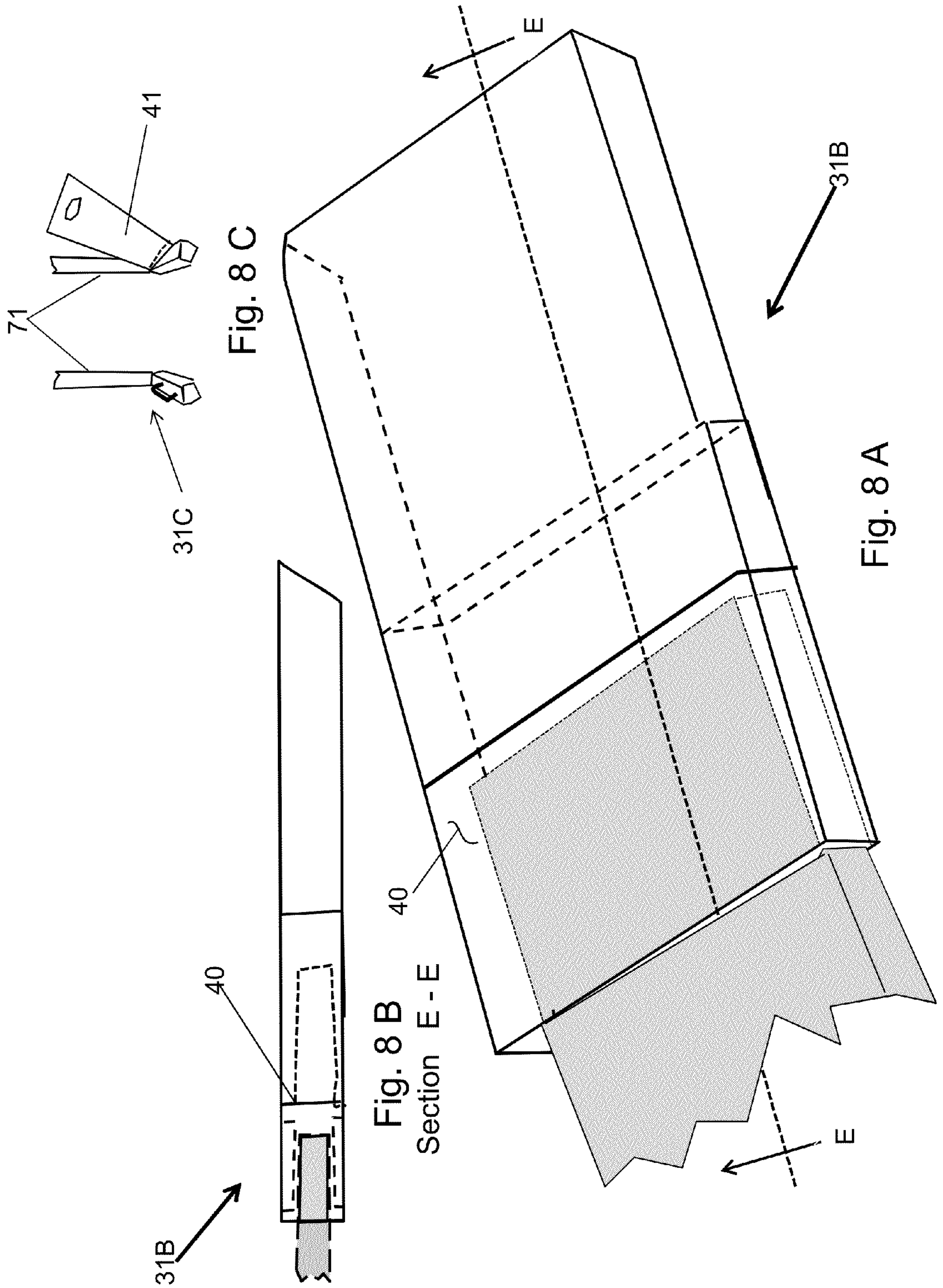
FIGS. 8 A through 8 C show the general sketches of alternative embodiments of the special wheelchair device for fully supporting the feet of the user with features and components noted.
Figure 9A:
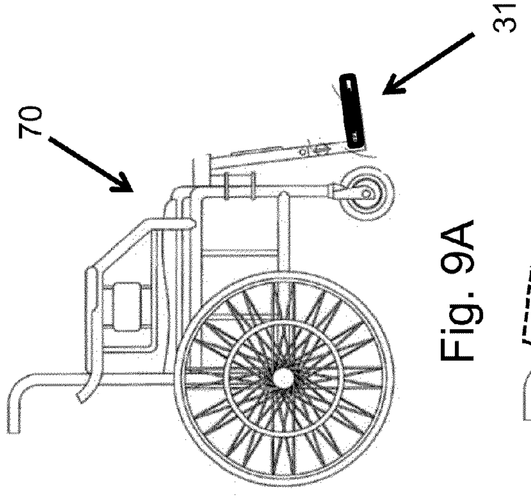
FIGS. 9 A through 9 D show the general sketches of the preferred embodiment of the special wheelchair device in operation.
Figure 9B:
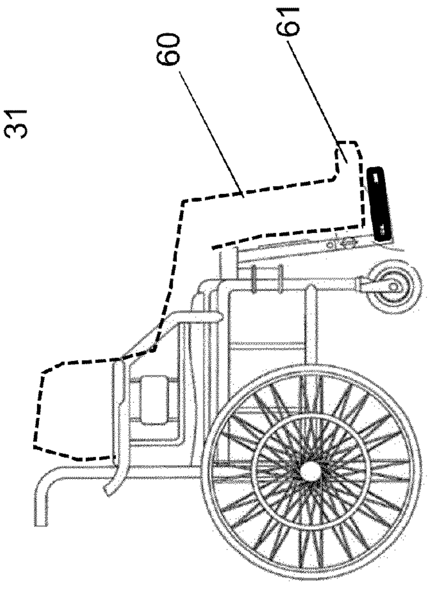
Figure 9C:
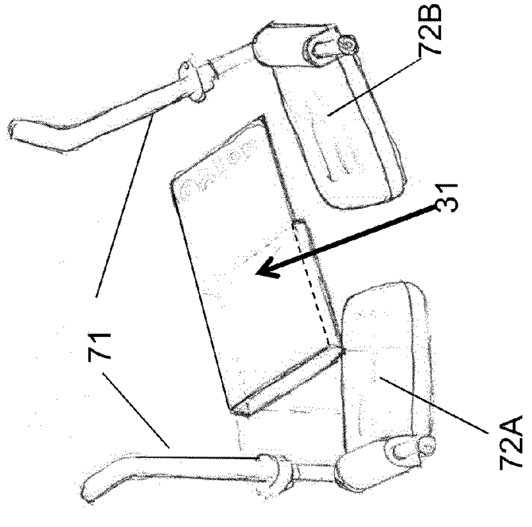
Figure 9D:
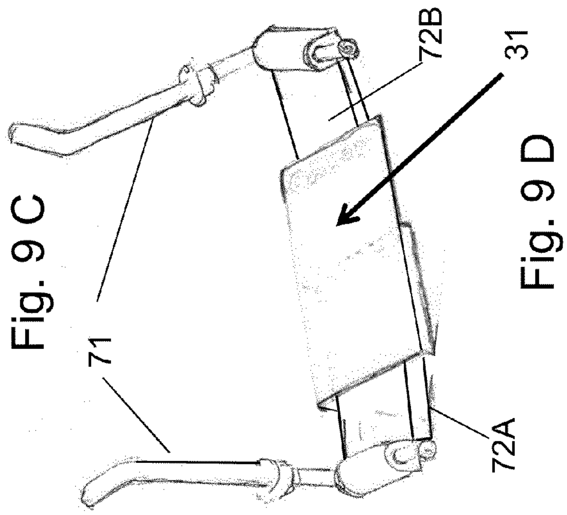

| Ref # | Description |
|---|---|
| 38 | bottom surface 38 |
| 38A | means 38A for securing flap of sheet (adhesive, weld, or the like) |
| 39 | sides 39 of device |
| 40 | telescopic slip fit SECTION 40 on the alternative embodiment 31B |
| 40A | alternative telescoping section 40A with tube 43 |
| 40B | alternative telescoping section 40B with tube 43 and extension 49 |
| 41 | hinged single plate 41 (FIG. 8C) |
| 42 | end shelf section 42 |
| 43 | tube extension 43 |
| 44 | main section structure for use with tube extension 43 |
| 44A-44E | various dimensions of the main section structure for use with tube extension 44A through 44E |
| 45 | control slot 45 |
| 46 | control slot protrusion 46 |
| 47 | thumb aperture 47 |
| 48 | thumb rise feature 48 |
| 49 | alternative extension “Cee” section 49 |
| 60 | wheel chair user 60 - elderly, infirm, non-ambulatory, recovering injured or the like |
| 61 | feet 61 of the user 60 |
| 70 | wheelchair 70 |
| 71 | foot plate tubular support structure 71 |
| 72A | foot plate/pedal 72A of the wheelchair 70 |
| 72B | foot plate/pedal 72B of the wheelchair 70 |
| 80 | prior Art Patent No. U.S. Pat. No. 6,773,073 |
| 81 | prior Art Patent No. U.S. Pat. No. 6,089,658 |
| 82 | prior Art Patent No. U.S. Pat. No. 5,833,318 |
| W1OD | outside width W1OD of main section 44 |
| W1ID | inside width W1ID of main section 44 |
| W2OD | outside width W2OD of tube section 43 |
| W2ID | inside width W2ID of tube section 43 |
| W3OD | outside width W3OD of alternative extension section 49 |
| L1 | length L1 of main section 44 |
| L1A | length L1A of tubular portion of main section 44 |
| L2 | length L2 of tube section 43 |
| L3 | length L3 of alternative extension section 49 |
| H1OD | outside height H1OD of main section 44 |
| H1ID | inside height H1ID of main section 44 |
| H2OD | outside height H2OD of tube section 43 |
| H2ID | inside height H2ID of tube section 43 |
| H3OD | outside height H3OD of alternative extension section 49 |
| R1 | corner radius R1 of main section 44 |
| R2 | corner radius R2 of tube section 43 |
| T1 | the general thickness T1 of the main section structure 44 - approximately ½ of (W1OD-W1ID) and ½ of (H1OD-H1ID). |
| T2 | the general thickness T2 of the tube extension 43 - approximately ½ of (W2OD-W2ID) and ½ of (H2OD-H2ID). |
| T3 | the general thickness T3 of the alternative extension “Cee” section 49 |

DETAILED DESCRIPTION OF PREFERRED EMBODIMENT

The present invention presented is the special wheelchair device for fully supporting the feet of the user. This device relates to a growing need for better means to support feet when the user is in a wheelchair. Specifically, the present device relates to wheelchair foot rest or supports and more particularly pertains to a new wheelchair support accessory for providing added comfort and safety to a person confined to a wheelchair. The preferred embodiment of the special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf and recess; and configured with an internal aperture of the device which slides over and essentially encases one of the foot plates of the wheelchair and wherein the shelf extension end may rest on top of the other foot plate which results in a spanning and closure of the space between the two foot plates.

Figure 10A:
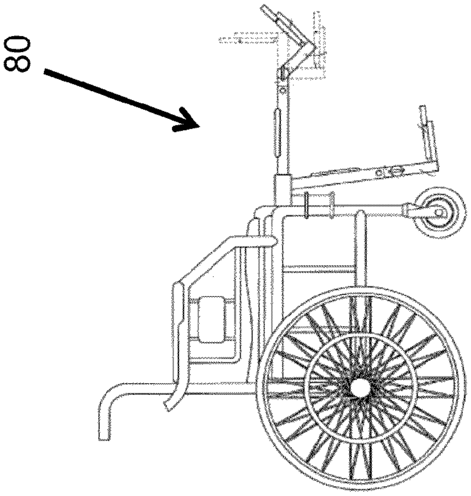
Fig. 10 A Prior Art
FIGS. 10 A through 10 C are examples of prior art for the general wheelchair devices for supporting the feet of the user.
Figure 10B:
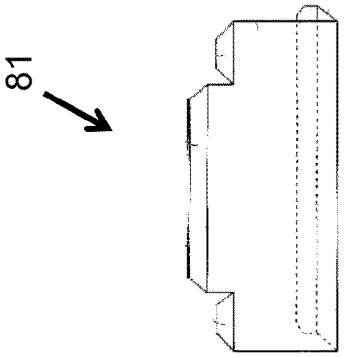
Fig. 10 B Prior Art
Figure 10C:
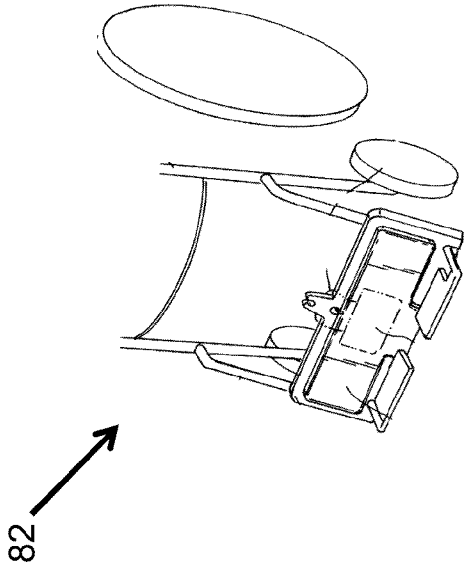
Fig. 10 C Prior Art

There is shown in FIGS. 1-10 a complete detailed and operative embodiment of the special wheelchair device for fully supporting the feet of the user. In the drawings and illustrations, one notes well that the FIGS. 1 through 8 show details of the special configuration. FIG. 9 helps to describe its use and operation. FIG. 10 show prior art of support devices in the wheel chair attachment industry.

The advantages of the special wheelchair device for fully supporting the feet of the user are listed above in the introduction. Succinctly the benefits for the device are:

A. Increases the support for feet of the user, especially the elderly, infirm or others who are not ambulatory and who may spend long periods of time in the wheelchair.

B. Is easy to handle and install for the user and the caretaker.

C. Requires no tools for installation.

D. Is simple to manufacture.

E. Has no sharp edges or pinch points.

F. May be manufactured from recycled materials.

G. Is a universal design that fits practically all designs of wheelchairs both new and used.

H. Is small and compact so that it is easy to package for sale or kept in storage.

I. Expands to fit many sizes and widths of wheel chairs.

J. Is easy to adjust.

K. Minimizes production tools required.

The preferred embodiment of the special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf and recess; and configured with an internal aperture with features wherein the internal aperture of the device may slide over and essentially encase either one of the foot plates of the wheelchair and wherein the opposite end with the extension shelf can rest on the other of the un-encased foot plates/pedals which results in a spanning and closure of the space between the two foot plates. Simple instructions for installation and use can be printed on the device. An alternative embodiment is a wheelchair device for fully supporting a pair of feet of a user, the device comprised of (a) an partially enclosed sleeve of a length, a height, a width and a thickness, the sleeve with two ends, made of a durable material and configured with: (i) at least one of the two ends as an open tubular end with an encasing cross-section; (ii) at least two side surfaces; (iii) a second end opposite the open tubular end, elongated and with an essentially smooth bottom surface, and forming a shelf with the sides; (iv) a top surface of the sleeve with features; and (v) a means for securing the top and bottom surfaces; and (b) a tubular enclosed sleeve of a length, a height, a width and a thickness, the tubular enclosed sleeve with two ends, made of a durable material and configured with a cross-section less in height and width to enable the tubular enclosed sleeve to telescope interiorly to the partially enclosed sleeve wherein the tubular enclosed sleeve can slide over and essentially encase one of a pair of foot plates of the wheelchair and wherein the opposite shelf end of the partially enclosed sleeve may rest on the other un-encased pair of foot plates which results in a bridging of the space between the two foot plates.

The accompanying drawings, which are incorporated in and constitute a part of this specification, illustrate a preferred embodiment of the special wheelchair device for fully supporting the feet of the user. The drawings, together with the summary description given above and a detailed description given below, serve to explain the principles of the wheelchair foot support device. It is understood, however, that the device is not limited to only the precise arrangements and instrumentalities shown.

Figure 1:
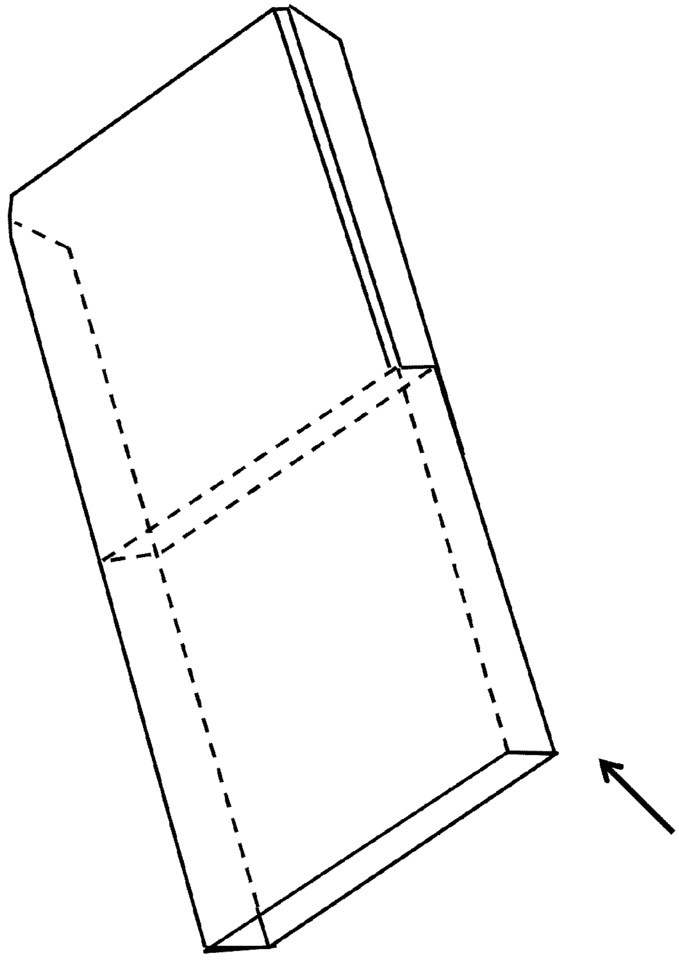
FIG. 1 is the general sketch of the special wheelchair device for fully supporting the feet of the user.

FIG. 1 is the general sketch of the preferred embodiment of the special wheelchair device 31 for fully supporting the feet 61 of the user 60. The components, features, materials and operation are described below.

FIG. 2 shows a sketch of the prototype 31A of the preferred embodiment (unfolded) of the special wheelchair device 31 for fully supporting the feet 61 of the user 60 with the specific features as shown in the following descriptions of the attached drawings and sketches.

Figure 3:
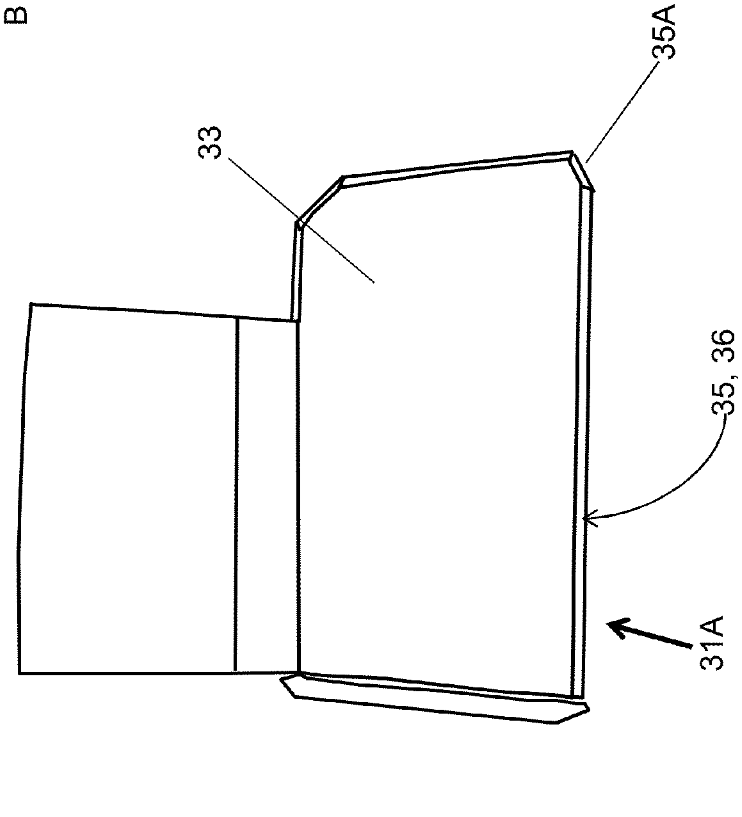
FIG. 3 shows a sketch of the prototype of the preferred embodiment of the special wheelchair device for fully supporting the feet of the user with the specific features and components noted.

FIG. 3 shows a sketch of the prototype 31A of the preferred embodiment of the special wheelchair device 31 for fully supporting the feet of the user with the specific features and components noted. Here one may view an open configuration showing the elements of the end 33 and the top surface 35 where the optional treads 36 (not shown) are located. One also should note the angle, rounded, beveled or the like corners 35A to provide a no cut configuration.

Figure 4A:
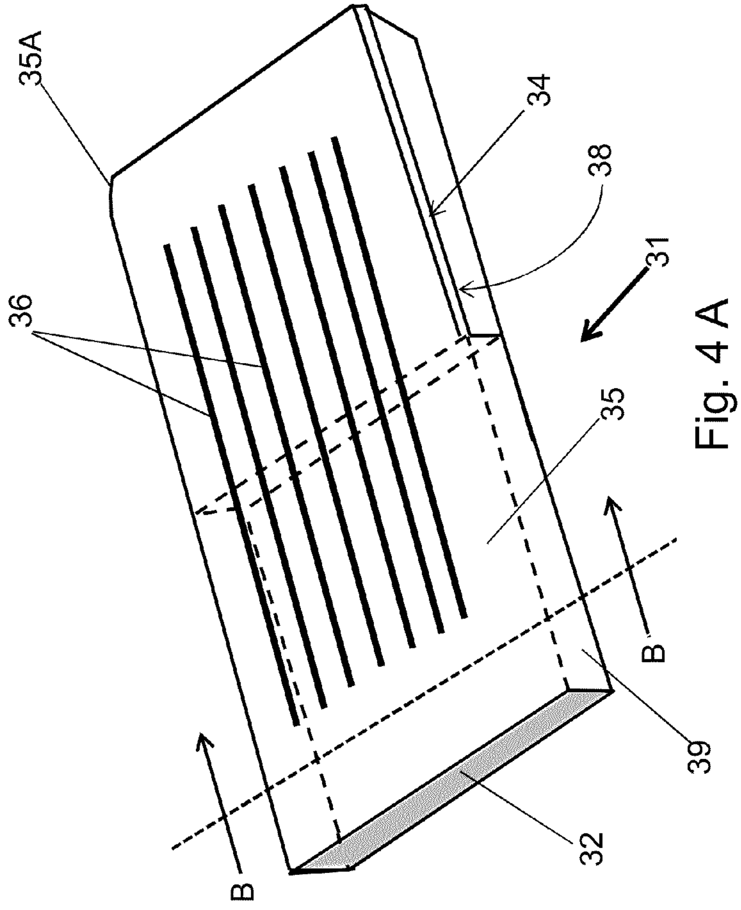
FIGS. 4 A and 4 B show the general sketch of the special wheelchair device for fully supporting the feet of the user with features and components noted.
Figure 4B:
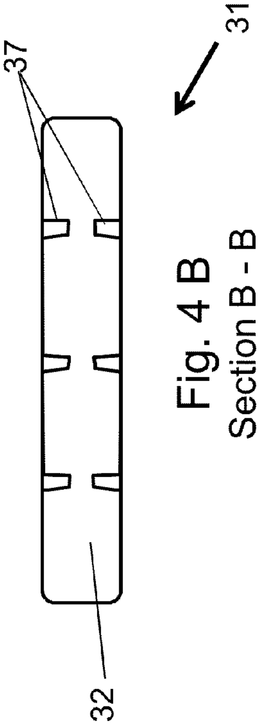

FIGS. 4 A and 4 B show the general sketch of the special wheelchair device 31 for fully supporting the feet 61 of the user 60 with features and components noted. In these sketches, one may see the top surface 35 with the optional tread-like or rough surface 36 that gives a certain amount of traction for the device 31 where the feet 61 rest. The joining point of the shelf feature 34 is at the end 33 on the bottom surface 38. The opposite end, the end 32 is seen. This is the part of the device 31 that removably yet securely encases either of the wheelchair 70 foot plates/pedals 72A and 72B (not shown in this view. The sides 39 connect the top surface 35 to the bottom extension of surface 38. In FIG. 4 B the important retainer feature 37 is shown. As will be shown, this feature secures the foot plate by an interference fit or wedge as either foot plate is inserted into the device 31 in the open end 32, which is opposite the shelf end 33.

Figures 5A, 5B, 5C:
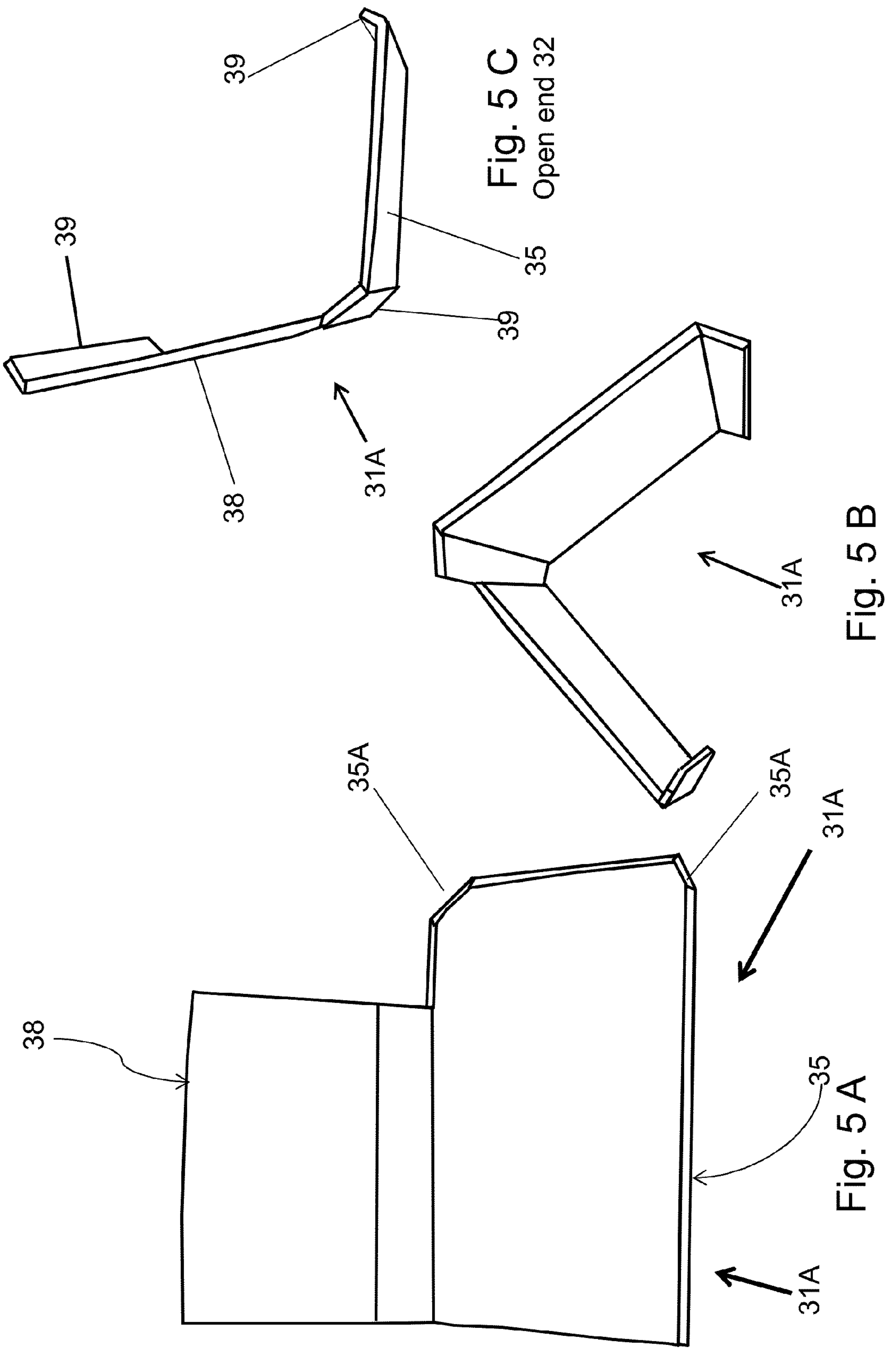
FIGS. 5 A through 5 C show additional sketches of the prototype of the preferred embodiment of the special wheelchair device for fully supporting the feet of the user with the specific features.

FIGS. 5 A through 5 C show additional sketches of the prototype 31A of the preferred embodiment of the special wheelchair device for fully supporting the feet 61 of the user 60 with the specific features. One may see that the prototype was stamped/cut from a formable material, then folded/bent to the desired shape. A glue or adhesive 38A material secures the surfaces of the device (if made of cardboard or a fiber sheet) as shown. If formed as one piece such as from metal or plastic, the adhesive is not required. FIG. 5 A shows an open view of the stamping/cutting of a flat initial piece of the device 31A with the bottom surface 38 and top surface 35 identified. FIG. 5 B shows a partially bent/folded view of the prototype 31A. FIG. 5 C shows a further step in the forming of the device prototype 31A with the sides 39, the top surface 35 and the bottom surface 38 all shown. One skilled in manufacturing devices and products similar to the device 31 has a full appreciation of the plethora of processes and materials that may be used to manufacture a special wheelchair device 31 for fully supporting the feet 61 of the user 60. As an example and not as a limitation for producing such a device 31, one skilled in manufacturing appreciates that the device 31 may be stamped from metal or a composite (paper-like, elastomeric rubber-like or plastic-like) and then formed or folded into the desired configuration. The sides and top may be contiguous in sheet form but some joining or means for securing 38A may require a welding (metals, plastic), adhesive (plastic, fiber, composites), or a special securing means such as a friction weld (plastic), heat weld, or other fastening means. Similarly, a composited or plastic material might be molded, a metal may be cast, or a fiber cardboard may be made from a slurry of mache' like substance and cast or molded . . . and later sealed if needed.

Figure 6B:
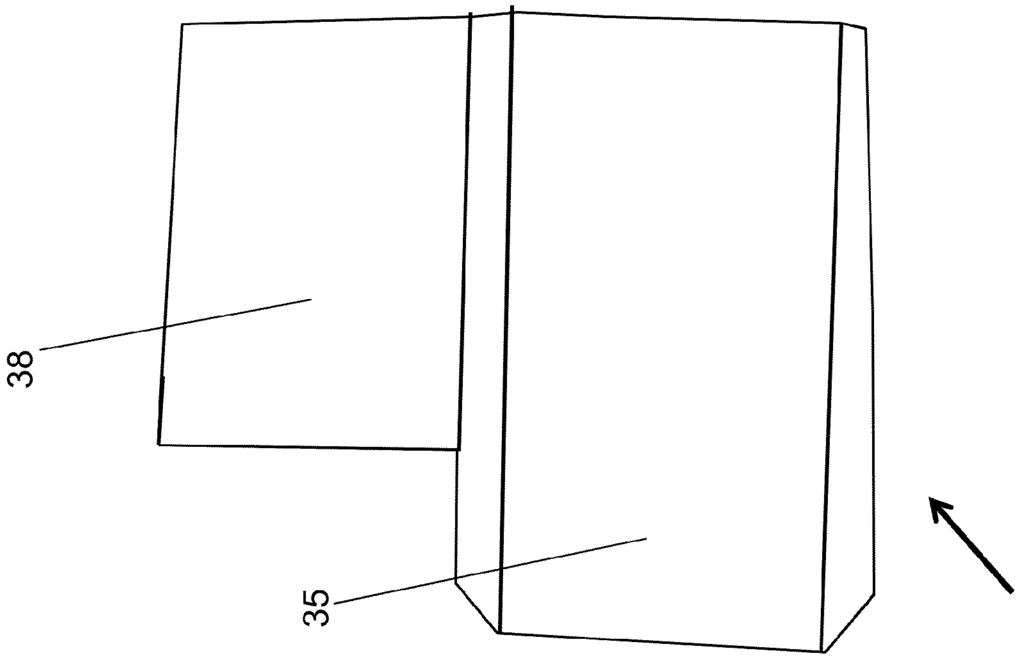
FIGS. 6 A and 6 *b* show more sketches of the prototype of the preferred embodiment of the special wheelchair device for fully supporting the feet of the user with the specific features.
Figure 6A:
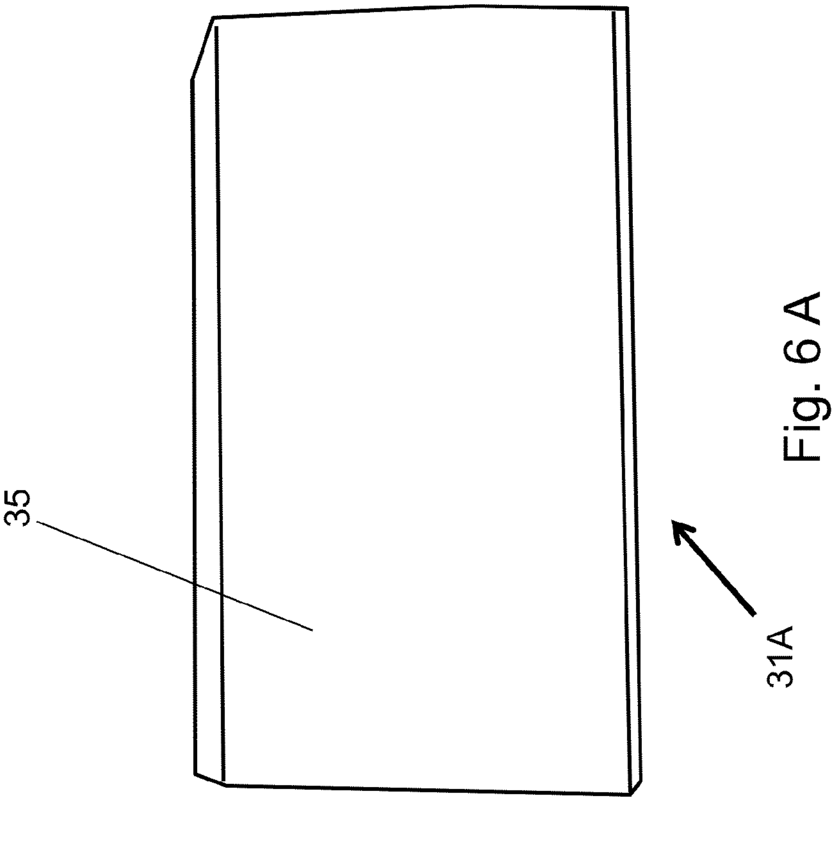

FIGS. 6 A and 6 B show more sketches of the prototype of the preferred embodiment 31A of the special wheelchair device 31 for fully supporting the feet 61 of the user 60 with the specific features. Here one may view the bottom 33 and top 35 in a closed (FIG. 6 A) and open (FIG. 6 B) position.

Figures 7A, 7B:
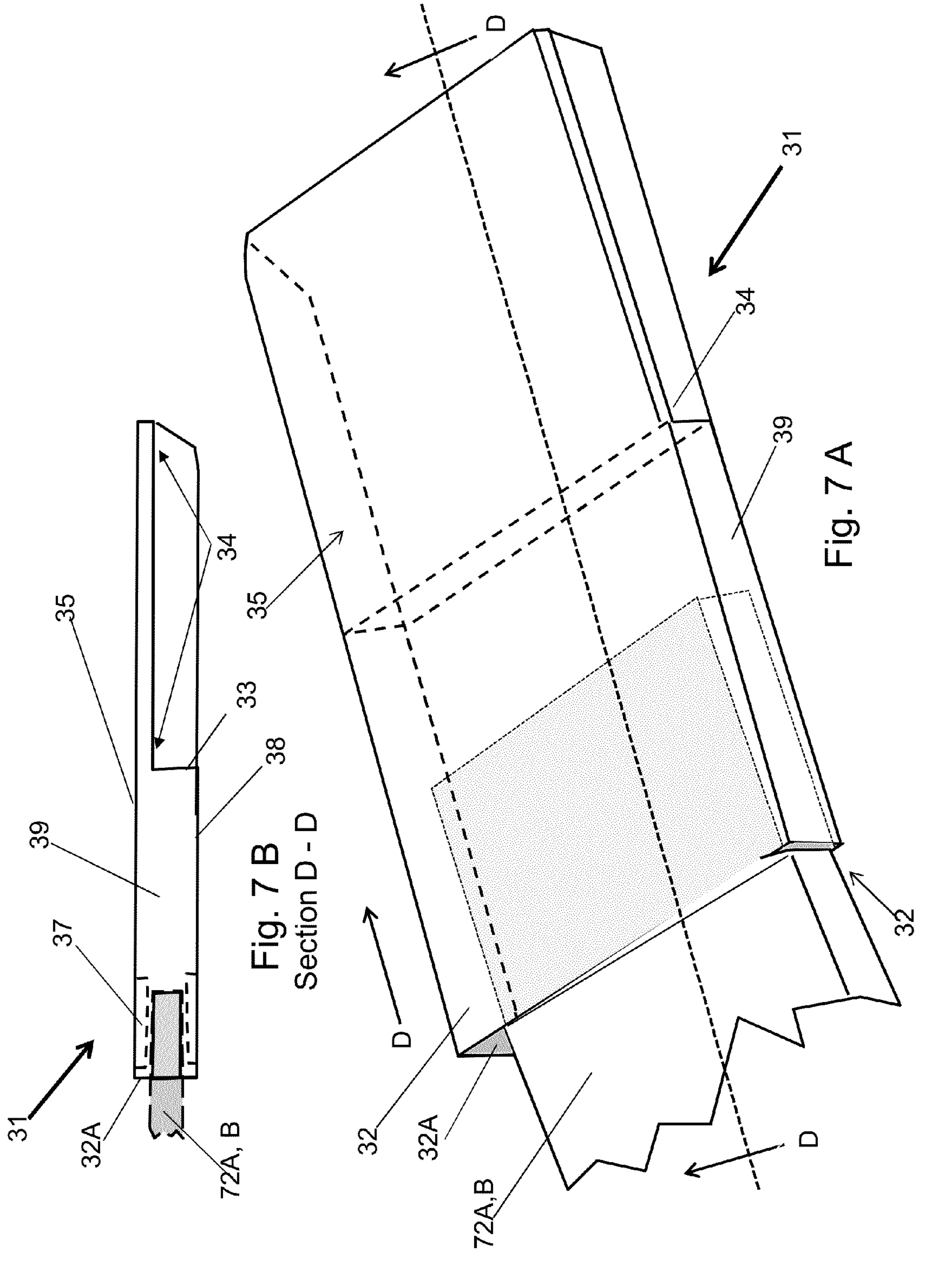
FIGS. 7 A and 7 B show more of the general sketches of the preferred embodiment of the special wheelchair device for fully supporting the feet of the user with features and components noted.

FIGS. 7 A and 7 B show more of the general sketches of the preferred embodiment 31 of the special wheelchair device for fully supporting the feet 61 of the user 60 with features and components noted. In FIG. 7 A, the side 39, the shelf 34, and the open end 32 are all depicted. Likewise the top surface 35 is shown with the treads or rough surface 36. Finally the foot plate 72A or 72B is shown starting to engage the open end 32 of the device 31. FIG. 7 B the cross section D-D of the device 31 is shown. The shelf end 34 is further depicted and the step like transformation on the bottom surface 38. The aperture 32A is open and permits the foot plates 72A or 72B to start to engage the device into the open end 32. One views also the closer vanes 37 that are tapered vane-like structures that interfere and grip or secure tightly the foot plates/pedals 72A or 72B as the plate engages the interior of the device 31 through the open end 32 aperture 32A. The vanes 37 may be of various shapes but provide an interference fit to the wheelchair foot plates. The materials and processes used to manufacture the device 31 may vary greatly. As a further example and not as a limitation the device may be made from a plastic or composite plastic of various types. A polyester, poly carbonate, estralon, co-polyesters and the like may be suitable. A durable, thin sheet plastic such as poly propylene, acrylic, poly urethane, urethane, and the like could prove useful as the material. Metals (such as stainless steel, aluminum, steel alloys, etc.) may be stamped and formed or cast (metals like aluminum, pot metals, etc.) to make the device 31. Any or all may have surface finished such as chrome, powdered materials paint and the like. Another material could be molded plastics or composites. Thermoplastic molding and blow molding may be inexpensive to produce the product with the configuration of this device 31. A composite fiber like cardboard or fiberboard may be attractive for stamping of casting a lower-cost device 31 in order to have a use-and-throw-away after one or more uses or a short time period. This could afford a hospital and nursing home facility a method to replace soiled or unsanitary devices that have been exposed to dirt, grime, food or other unsanitary products. Any material used of configuration would have rounded/safe edges.

FIGS. 8 A through 8 C show of the general sketches of alternative embodiments 31B and 31C of the special wheelchair device 31 for fully supporting the feet of the user with features and components noted. In FIG. 8 B, the device 31B has essentially the same features and functions as the preferred device 31. In addition, there is a split point 40 where the device 31 is essentially two pieces. This allows the open end 32 to telescope/slip fit around an end 33. The open end 32 may be adjusted for the length of the device 31B which permits the invention to be used with new or existing (used) wheel chairs of variously sized openings between the foot plates/pedals 72A and 72B. The additional features exhibited in the FIGS. 11 through 14, below, demonstrate the features and functions needed to enable the telescope embodiment to actually function effectively. In FIG. 8 C, the device 31C has a single plate 41 hinged and able to span the full space between legs 71.

FIGS. 9 A through 9 D show the general sketches of the preferred embodiment of the special wheelchair device in operation. These sketches are discussed below in the operations paragraphs.

FIGS. 10 A through 10 C are examples of prior art for the general wheelchair devices for supporting the feet of the user. FIG. 10 A shows a wheel chair leg support device 80 from a U.S. Pat. No. 6,773,073 issued to Escobedo in 2004. No special continuous foot support is shown. FIG. 10 B shows a complex utility device 81 called a wheel chair foot plate cover and stabilizer. The patent was issued in 2000 to Law for a Prior Art Utility U.S. Pat. No. 6,089,658. FIG. 10 C shows a wheel chair support accessory device 82 from 1998 Prior Art Utility U.S. Pat. No. 5,833,318 issued to Knight. None of these patents nor others cited above show the simple and functional configuration as the new Special wheelchair device for fully supporting the feet of the user 31.

Figures 11A, 11B, 11C, 11D, 11E, 11F, 11G, 11H:
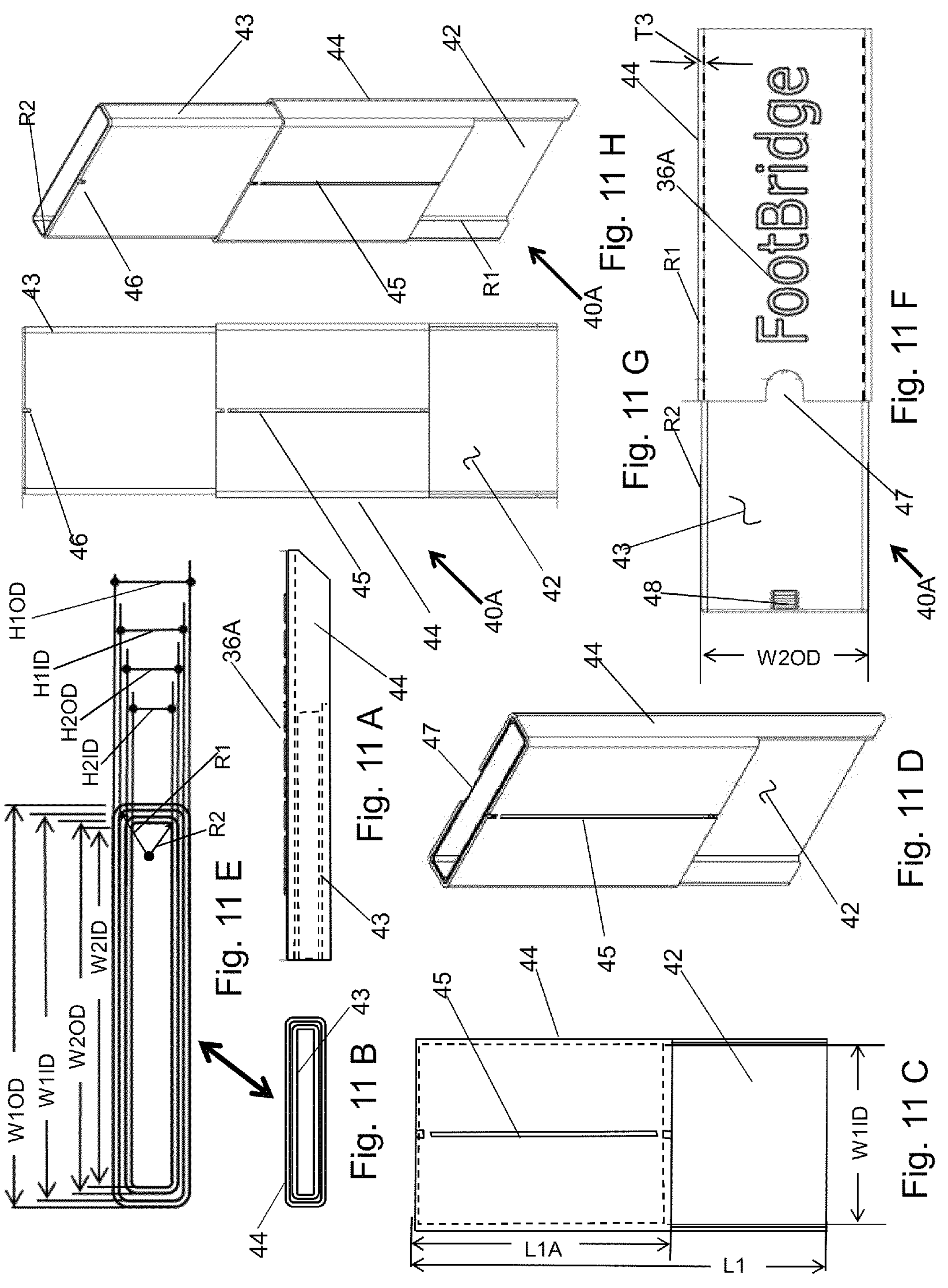
FIGS. 11A through 11 J are examples of an alternative telescoping section with a tube.
Figure 11J:
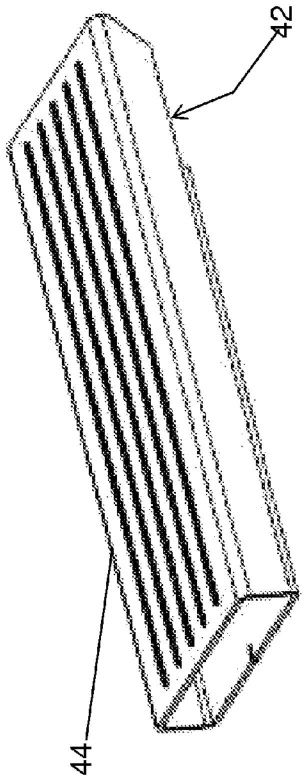
Figure 11I:
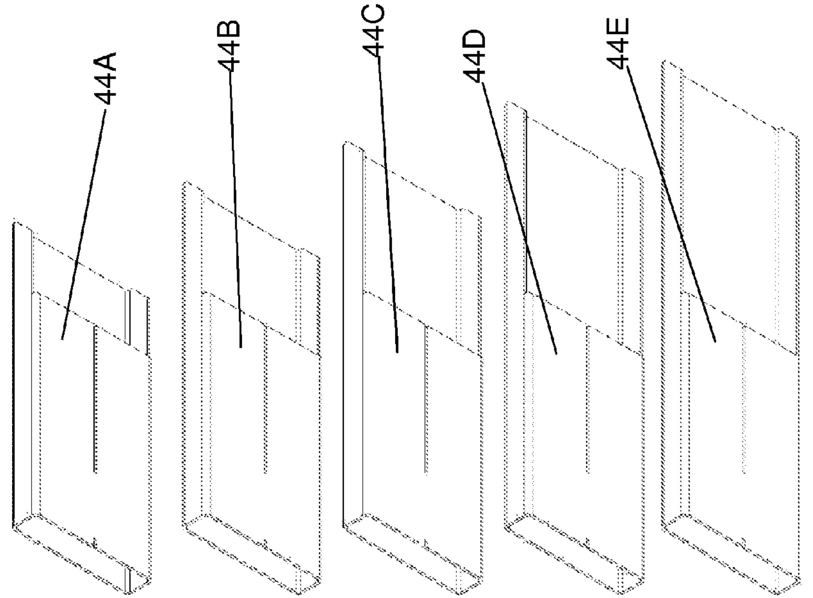

FIGS. 11A through 11 J and 12 A through D are examples of an alternative telescoping section 40A with a tube 43. Here is shown essentially two parts: a main section structure 44 for use with a tube extension 43 and the tube extension 43. The structure 44 and tube 43 have tops and bottoms with surfaces and sides. Various features of the two parts are demonstrated. A tread 36 or a writing or trademark 36A may be embossed or engraved on the top surface. The section 44 has a control slot 45 and a thumb aperture 47. The tube 43 has a protrusion 46 (for engaging the control slot 45) and a thumb rise feature 48. The dimensions of the height, width, length and the corner radiuses are indicated as: outside width W1OD of main section 44; inside width W1ID of main section 44; outside width W2OD of tube section 43; inside width W2ID of tube section 43; length L1 of main section 44; length L1A of tubular/encased portion of main section 44; length L2 of tube section 43; outside height H1OD of main section 44; inside height H1ID of main section 44; outside height H2OD of tube section 43; inside height H2ID of tube section 43; corner radius R1 of main section 44 and corner radius R2 of tube section 43. Of importance is how the alternative telescoping section 40A with tube 43 has the tube extension 43 contiguously sliding interior to the enclosed end of the main section 44. This closed end of section 44 and tube 43 may be adjusted linearly so that the overall length may extend or compress/contract as needed. The tube length L2 is contained interior to the encased portion L1A of the main section 44. One skilled in the art of such telescoping devices appreciates several relationships of the dimensions are needed: Radius R1 is greater than R2 (R1>R2); Outer dimension of Height H2OD for the tube 43 is less than the Inner Height Dimension H1ID of the main section 44 (H2OD<H1ID); and the Outer dimension of width W2OD for the tube 43 is less than the Inner Width Dimension W1ID of the main section 44 (W2OD<W1ID). These relationships permit the telescoping to slide contiguously, yet smoothly. The closer the respective dimensions, the tighter the contiguous fit of main section 44 and tube extension 43. Note also the general thickness T1 of the main section structure 44—approximately ½ of (W1OD−W1ID) and ½ of (H1OD−H1ID) and the general thickness T2 of the tube extension 43—approximately ½ of (W2OD−W2ID) and ½ of (H2OD−H2ID). Next, FIG. 11 I shows various lengths (44A through 44E) of the main section 44 can be provided to further extend the widths between the wheelchair pedals. FIG. 11 J shows an isometric of the main section 44. Note well the materials and other features are like those previously described in FIG. 5. The means to connect the sides, top and bottom surfaces are as described previously. One skilled in the arts of plastic and sheet or cast metals also appreciates the manner to form the tube 43 or main section 44 as a plastic molded part, cast metal or integrally formed composite material.

Figures 12, 12A, 12B, 12C, 12D, 13A, 13B, 13C, 13D, 14A, 14B, 14C, 14D, 14E:
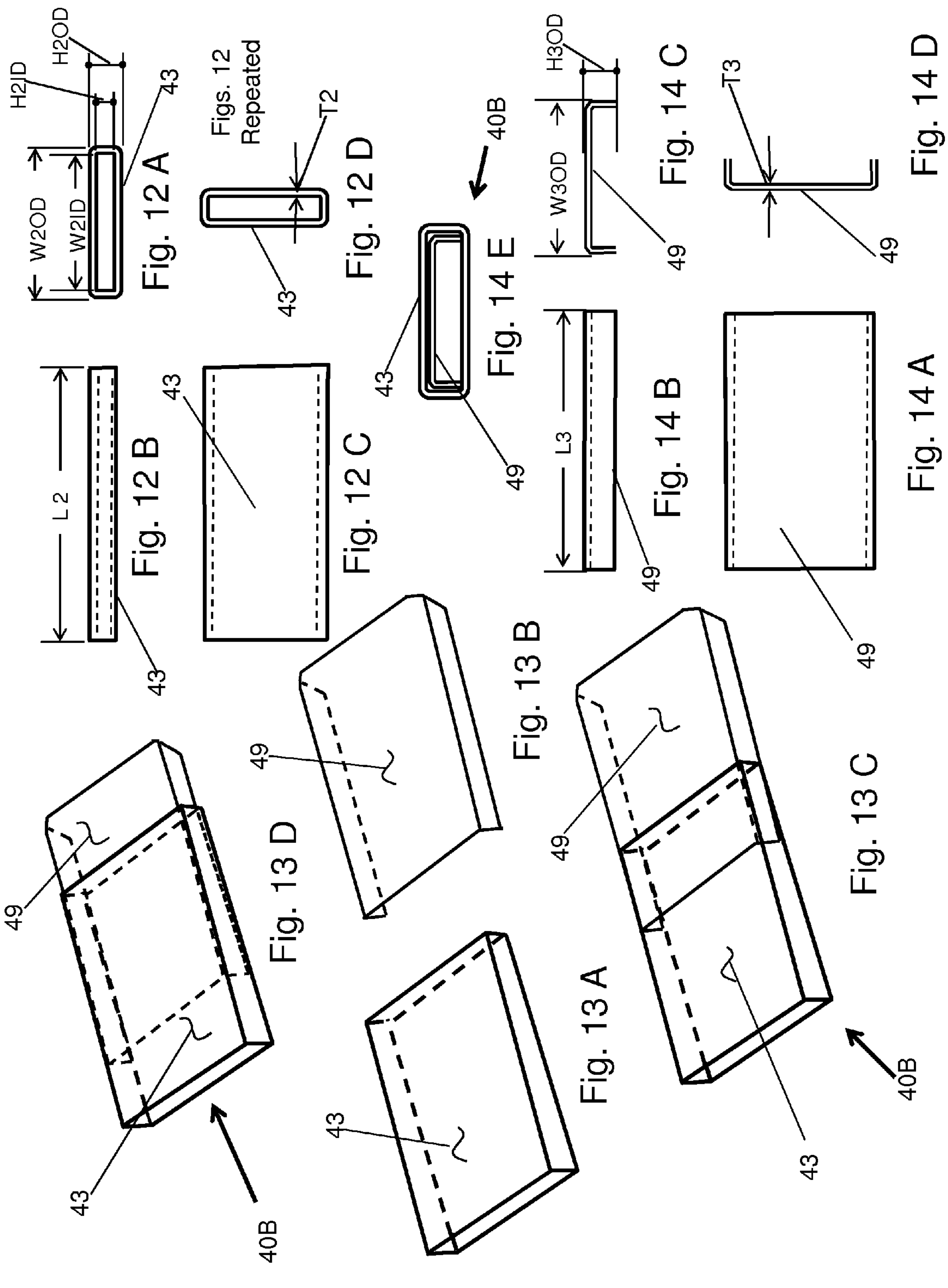
FIGS. 12 A through 12 D are sketches of the tube extension and details of the features.

A stated, FIGS. 12 A through 12 D are sketches of the tube extension 43 and details of the features dimensions described above.

FIGS. 13 A through 13 D are sketches of an alternative tube system 40B as an extension device for the wheelchair support for supporting a pair of feet of the user. Here the above described tube 43 now is the outer of two members. An alternative extension section 49 is interior to the tube 43. This alternative extension section 49 is essentially a flat backed-section “Cee” with its “toes” down. This allows the “Cee” section to serve as the shelf portion.

FIGS. 14 A through 14 E are sketches of the alternative extension shelf 49 used interior to the tube 43. Similar to the other sliding device described above, the sections of the “Cee” 49 and tube 43 have relationships of their respective dimensions to permit a contiguous telescoping. Here, the Outer dimension of Height H3OD for the “Cee” section 49 is less than the Inner Height Dimension H2ID of the tube 43 (H3OD<H2ID); and the Outer dimension of width W3OD for the “Cee” section 49 is less than the Inner Width Dimension W2ID of the tube 43 (W3OD<W2ID). These relationships permit the telescoping to slide contiguously, yet smoothly. The closer the respective dimensions, then the tighter the contiguous fit of the “Cee” section 49 and tube 43. Also note the general thickness T3 of the alternative extension “Cee” section 49

All of the details mentioned here are exemplary and not limiting. Other components specific to describing the new special wheelchair device for fully supporting the feet of the user may be added, as a person having ordinary skill in the field of wheelchair accessories and supports and related devices in the health care appliance industry well appreciates.

Operation Of The Preferred Embodiment

The preferred embodiment of the special wheelchair device for fully supporting the feet of the user has been described in detail above. The manner of how the device operates is described below. A person having ordinary skill in the field of wheelchair accessories and supports and related devices in the health care appliance industry, will note that the description above and the operation described here must be taken together to fully illustrate the concept of the special device 31.

FIGS. 9 A through 9 D show the general sketches of the preferred embodiment of the special wheelchair device 31 in operation. FIG. 9 A shows the basic wheel chair 70 with the device 31 already attached. FIG. 9 B shows the wheelchair 70 with a user/person 60 sitting in the chair with their feet 61 resting on the device 31. FIG. 9 C shows the device 31 ready to be removably and adjustably attached to the foot plates 72A and 72B. How to accomplish this is shown immediately below in Table C. Note that the foot plates 72A and 72B are removably and securely attached at the ends of the wheelchair tubular supports 71 which are in turn connected directly to the wheelchair 70 shown in FIG. 9 A. In FIG. 9 D the device 31 is shown being fully installed to the foot plates/pedals 72A and 72B with the open end 32 encasing foot plate 72A and the shelf 34 and end 33 under shelf 34 contiguous and touching/resting/supported by the foot plate 72B. One easily notes that this device 31 could easily be used in the reverse with the foot plate 72B encased and foot plate 72A as the support.

The simplicity to use this special wheelchair device 31 for fully supporting the feet of the user is demonstrated in the process below in Table C. This is exemplary and not meant to restrict and limit the process to use the special wheelchair device for fully supporting the feet of the user.

TABLE C

| Process to use the device | |
|---|---|
| Step | Description<br>No tools required for Installation |
| 1 | Flip the foot plates/pedals 71A and 72B of the wheelchair 70 to a vertical position |
| 2* | Slip the open end 32 of the device 31 over either foot plate 72A or 72B |
| 3 | Hold-up the feet 61 of the user 60 |
| 4 | Lower the foot plate that does not have the device 31 attached |
| 5 | Lower the other foot plate that does have the device 31 attached and rest it onto the top of the other afore-lowered foot plate. |
| 6 | Lower the feet 61 of the user 60 |

*For the alternative telescoping section 40A and 40B with tube 43, Step 2 would also have a Step 2 A - Place the tube 43 on the first wheelchair pedal and then extend the tube a sufficient distance to bridge the gap between the wheelchair foot plate/pedals and allow the recess 42 to fully engage the second pedal.

With the above description or the product device and method to use, it is to be understood that the special wheelchair device for fully supporting the feet of the user is not to be limited to only the disclosed embodiment. The described features of the special device 31 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless they are defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other of the embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language References to specific examples, use of "i.e.," use of the word "invention," etc., are not meant to otherwise restrict the scope of the recited claim terms. Nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless they are otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed for letters patent is:

1. A device used in cooperation with a wheelchair for fully supporting a pair of feet of a user, the device comprised of:

(a) a partially enclosed sleeve having a length, a height, a width, a thickness and two opposing ends, the partially enclosed sleeve made of a durable material, and wherein:

(i) a first end of the two opposing ends is an open tubular end, the open tubular end having a top with a top surface, a bottom with a bottom surface and a pair of sides;

(ii) a second end of the two opposing ends is a shelf end and is opposite the open tubular end, the shelf end having a smooth bottom surface and a top surface and being contiguous and connected with the top surface of the open tubular end; the shelf end having a pair of sides, each side of the shelf end being contiguous with the sides of the open tubular end; and the top surface of the shelf end and the pair of sides of the shelf end forming a shelf; and (iii) the contiguous top surface of the two opposing ends of the partially enclosed sleeve includes at least one feature; and the device further comprised of:

(b) a tubular enclosed sleeve having a length, a height, a width and a thickness, the tubular enclosed sleeve having two ends, a top with a top surface with at least one feature, a bottom with a bottom surface, and a pair of sides, the tubular enclosed sleeve made of a durable material, and the height and the width of the tubular enclosed sleeve, in cross-section, is less than the height and the width of the partially enclosed sleeve, in cross-section, such that the tubular enclosed sleeve is configured to telescope within an interior of the open tubular end of the partially enclosed sleeve, and wherein the tubular enclosed sleeve is configured to slide over and encase one of a pair of foot plates of the wheelchair and wherein the partially enclosed sleeve is configured to rest on the other of the pair of foot plates which results in the device bridging a space between the pair of foot plates.

2. The device according to claim 1, wherein the at least one feature of the contiguous top surface of the two opposing ends of the partially enclosed sleeve is a series of treads.

3. The device according to claim 1, wherein the at least one feature of the contiguous top surface of the two opposing ends of the partially enclosed sleeve is a written word.

4. The device according to claim 1, wherein, for both the partially enclosed sleeve and the tubular enclosed sleeve, the top surfaces, the pair of sides and the bottom surfaces are joined by a series of corners at a junction of the top and bottom surfaces with each of the sides.

5. The device according to claim 4, wherein the series of corners include a beveled configuration.

6. The device according to claim 4, wherein the series of corners include a radiused configuration.

7. The device according to claim 1, wherein the bottom of the partially enclosed sleeve is further comprised of a control slot and the feature of the top surface of the tubular enclosed sleeve is a mating protrusion engageable with the control slot.

8. The device according to claim 1, wherein the durable material is a metal.

9. The device according to claim 8, wherein the metal is selected from a group consisting of stainless steel, aluminum, pot metal, and steel alloys.

10. The device in claim 9, wherein the at least one feature is a surface finish on the metal selected from a group consisting of chrome plating, powder coating or painting.

11. The device according to claim 1, wherein the durable material is a composite material.

12. The device according to claim 11, wherein the composite material is a reinforced plastic.

13. The device according to claim 12, wherein the reinforced plastic is a material composition selected from a group consisting of a polyester, a poly carbonate, an estralon, co-polyesters, a poly propylene, an acrylic, a poly urethane, and a urethane composition.

14. The device according to claim 11, wherein the composite material is a fiber-containing material selected from a group consisting of cardboard, fiberboard, and pressed wood-board.

15. A device used in cooperation with a wheelchair for fully supporting a pair of feet of a user, the device comprised of:

(a) a tubular enclosed sleeve having a length, a height, a width and a thickness, the tubular enclosed sleeve having two ends, a top with features, a bottom and a pair of sides, and wherein the top, the bottom and the pair of sides all are made of a durable material, and the height and the width of the tubular enclosed sleeve, in cross-section, are sized to telescopically receive a Cee-shaped section;

(b) a Cee-shaped section having a length, a height, a width and a thickness, the Cee-shaped section made of a durable material, the height and width of the Cee-shaped section, in cross-section, being less than the height and width of the tubular enclosed sleeve, in cross-section, such that the Cee-shaped section is slidable to telescope within an interior of the tubular enclosed sleeve, and wherein the Cee-shaped section includes:

(i) a top surface with a pair of opposite ends;

(ii) a pair of side surfaces extending downward from the top surface of the Cee-shaped section; and (iii) a means to connect the pair of side surfaces to the top surface; and wherein the tubular enclosed sleeve is configured to slide over and encase one of a pair of foot plates of the wheelchair and wherein the Cee-shaped section is configured to rest on the other of the pair of foot plates of the wheelchair which results in the device bridging a space between the pair of foot plates.

* * * * *